United States Patent [19]

Barteck

[11] 4,354,194

[45] Oct. 12, 1982

[54] WIDEBAND INK DROP GENERATOR

[75] Inventor: Joseph C. Barteck, Longmont, Colo.

[73] Assignee: International Business Machines Corporation, Armonk, N.Y.

[21] Appl. No.: 203,089

[22] Filed: Nov. 3, 1980

[51] Int. Cl.³ .............................................. G01D 15/18

[52] U.S. Cl. .................................. 346/75; 346/140 R

[58] Field of Search .......................... 346/75, 1, 140 IJ

[56] References Cited

U.S. PATENT DOCUMENTS

| | | | |
|---|---|---|---|
| 3,334,351 | 8/1967 | Stauffer | 346/75 |
| 3,958,249 | 4/1976 | DeMaine et al. | 346/1 |
| 4,153,901 | 5/1979 | White et al. | 346/75 |
| 4,228,440 | 10/1980 | Horike et al. | 346/75 |
| 4,231,047 | 10/1980 | Iwasaki et al. | 346/75 |
| 4,245,225 | 1/1981 | Fillmore et al. | 346/75 |
| 4,245,227 | 1/1981 | Krause | 346/75 |
| 4,303,927 | 12/1981 | Tsao | 346/75 |

*Primary Examiner*—George H. Miller, Jr.
*Attorney, Agent, or Firm*—Joscelyn G. Cockburn

[57] ABSTRACT

A wideband ink jet drop generator for breaking up one or more capillary ink streams emanating from the generator, into a regular succession of drops. The drops are of uniform size and uniformly spaced. The generator includes an orifice support plate with a cavity on one surface. A nozzle wafer with one or more orifice is mounted on the opposite surface of the plate. The orifices are in fluidic communication with the cavity. A pair of elongated crystals are disposed on the cavity surface of the support plate. The crystals are configured in spaced relation with the orifices of the nozzle wafer positioned between the crystals along a line whereat pressure waves emanating from the crystal are reinforced.

19 Claims, 5 Drawing Figures

WIDEBAND INK DROP GENERATOR

CROSS-REFERENCE TO RELATED APPLICATIONS

Patent Application Ser. No. 780,572, filed Mar. 23, 1977, entitled "Apparatus for Exciting an Array of Ink Jet Nozzles and Method of Forming" and assigned to the assignee of the present invention describes a drop generator wherein a piezoelectric transducer forms a wall of an ink cavity, which has a linear array of ink jet nozzles communicating therewith. The piezoelectric transducer is preferably an arcuate sector of a cylinder having an angle no greater than 180° with its mean radius, wall thickness, and its arcuate angle selected so that the arcuate sector vibrates only in a selected symmetrical mode at a selected resonant frequency when a voltage is applied at that frequency. The length of the transducer is chosen to be longer than the length of the linear array of nozzles so that the periodic pressure waves produced in the ink cavity by the transducer vibrating at the selected resonant frequency will have substantially the same amplitude at the entrance of each of the nozzles to form droplets of substantially uniform size and at substantially the same break-off point. The applied voltage selected is that which is necessary to produce uniformly satellite-free droplets from the array of ink streams.

Patent Application Ser. No. 958,916, filed Nov. 8, 1978, entitled "Ink Jet Head" and assigned to the assignee of the present invention describes a drop generator having an inner cylindrical tube spaced from an inner cylindrical surface of an outer means to have an ink cavity therebetween from which ink is supplied through one or more ink jet nozzles.

BACKGROUND OF THE INVENTION

1. Field of the Invention

The present invention relates to drop generators used to generate uniform droplets used for printing on a recording surface.

2. Prior Art

In an ink jet printing system, a pressurized volume of print fluid such as ink is supplied into the ink receiving cavity of a drop generator. The ink is extruded as one or more capillary streams through one or more orifices coupled to the ink receiving cavity. A crystal which is disposed relative to the ink cavity is excited and creates a perturbation so that the streams are broken up into a plurality of droplets. The droplets are then controlled for writing on a recording surface.

It is desirable that the droplets produced from the streams passing through each of the nozzles have substantially the same break-off point, be substantially uniform in size, have substantially uniform spacing between the droplets, and be satellite-free. This ensures that the quality of the print from each of the nozzles will be substantially the same.

To obtain this uniformity between the drolets of the various streams, it is necessary that the perturbations applied to each of the ink streams of the nozzles be substantially uniform and that the nozzles be of uniform quality. Furthermore, for the production of the droplets to be satellite-free, it is necessary that the perturbations be sufficiently large. It also is necessary for the perturbations to not only be substantially uniform but to be reproducible throughout the time that the droplets are being produced.

To meet these basic requirements, it is necessary that the transducer or driver, which produces the vibrations for causing the perturbations in the ink streams, be capable of operation so that the amplitude of each of the pressure waves produced in the ink cavity by the driver is substantially the same at the entrance to each of the ink jet nozzles. This will produce uniform perturbations in the ink jet streams flowing through the nozzles. It also is necessary for the amplitude of the pressure waves to be sufficiently high to produce satellite-free droplets.

The prior art abounds with drop generators whose designs and/or configurations strive to achieve the aforementioned qualities. U.S. Pat. No. 4,153,901 describes a multinozzle drop generator wherein a hemicylindrical or half cylinder crystal is used to create the disturbance. The drop generator consists of a carrier base or back plate in which an ink cavity and ink supply lines are fitted. The cavity is filled with a layer of resonance attenuating compound such as epoxy and Teflon. The teflon/epoxy layer is needed to attenuate unwanted resonances and reflections which affect the efficiency of the drop generator with frequency changes. The hemicylindrical crystal is mounted in the cavity with its concave surface facing upwardly. A gasket is fitted over the crystal and seals the cavity forming an ink chamber. A nozzle plate having a plurality of nozzles is then fitted over the gasket. A front plate with an elongated slot is fitted over the nozzle plate. The slot is aligned with the orifices. The components are held in position against the back plate by support screws.

The major problem with the hemicylindrical drop generator is that the drop generator is nonextendable. The term nonextendable means that neither the length of the nozzle array (that is the number of nozzles needed for printing) nor the drop frequency (that is the frequency used to drive the crystal) can be changed without undue degradation in the performance of the drop generator. Degradation includes nonuniform break-off of droplets, satellite problems, etc. By using the layer of resonance attenuating compound, the prior art tends to improve the probability for limited frequency change. However, the range of the frequency change is very limited. Moreover, the prior art does not address the problem of increasing the number of orifices in the nozzle plate.

The use of a resonating attenuating compound in the prior art drop generators tends to increase the overall cost of the drop generator. The cost increase stems from increase in assembly time and the cost of the layer.

As is well known to those having ordinary skill in the art, in order to reproduce copies with acceptable print quality, any change in the speed of the transport used to transport paper past the drop generator requires a change in the drop frequency. Also, changes in the print resolution requires changes in the drop frequency. It is therefore obvious that the prior art which has the capability to operate at a single frequency or at most, within a range of limited frequency change, is not suitable for use in several types of ink jet printers. In other words, the prior art drop generators tend to impose undue limitations on the overall design and operation of the entire ink jet printer.

Another type of prior art drop generator for use in an ink jet printer is described in U.S. Pat. No. 3,958,249. Pressurized print fluid such as ink is supplied to a tube having a nozzle plate with an orifice communicating with the interior of the tube. A cylindrical radially contracting and expanding transducer surrounds the tube and the nozzle plate. When a signal is applied to the transducer, the perturbations change the cross-sectional area of the tube and/or orifice, and as a result, the stream emitted from the orifice is broken up into droplets.

The main problem with this type of drop generator is that the tube and/or nozzle plate must be deformed. As such, a relatively large amount of power is required. Also, it would appear as if the invention has limited use with a single nozzle head. Invariably with a multinozzle head, it would be impractical to encase the head with a cylindrical transducer. Moreover, the power requirement for such a configuration would be prohibitively high.

Yet another type of prior art drop generator is described in U.S. Patent 3,334,351. In the patent, two separate transducers arranged at different angles, input dual motion to a single nozzle. The arrangement is manifestly inefficient. Moreover, when applied to a multinozzle head, the arrangement would result in a complex motion, making attainment of uniform drop break-off for all streams extremely difficult.

SUMMARY OF THE INVENTION

It is therefore the object of the presentuniformity break-off characteristics for a wide range of frequencies.

It is another object of the present invention to provide a drop generator adaptable for acceptable usage as a long head (say 140 or more nozzle orifices) or a short head (say 23 or less nozzle orifices).

It is still another object of the present invention to provide a cheaper and more efficient drop generator then has heretofore been possible.

In accordance with the present invention, a drop generator including a pair of radially expanding and contracting crystals are disposed diametrically to form opposite sides of a resonating cavity. The cavity is fitted with a conduit through which pressurized ink is supplied. When a source of electrical signals are coupled to the crystals, they vibrate radially and emit pressure waves which reinforce themselves along a pressure line midway between the crystals. An elongated nozzle wafer carrying a linear row of orifices is disposed so that the center line of the orifices coincides with the pressure line and in fluidic communication with the cavity. Ink streams emanating through the orifices are broken up into droplets at a uniform distance from the nozzle wafer.

In another embodiment of the invention, the crystals are coupled to opposite surfaces of a wave guide. The pressure waves or perturbations are conducted by the wave guides into the ink. By segmenting the crystals, a longer head drop generator can be designed with uniform drive over the length of the crystal.

The foregoing and other features and advantages of the invention will be apparent from the following more particular description of the preferred embodiment of the invention, as illustrated in the accompanying drawings.

DETAILED DESCRIPTION OF THE PREFERRED EMBODIMENT

Figure 2:
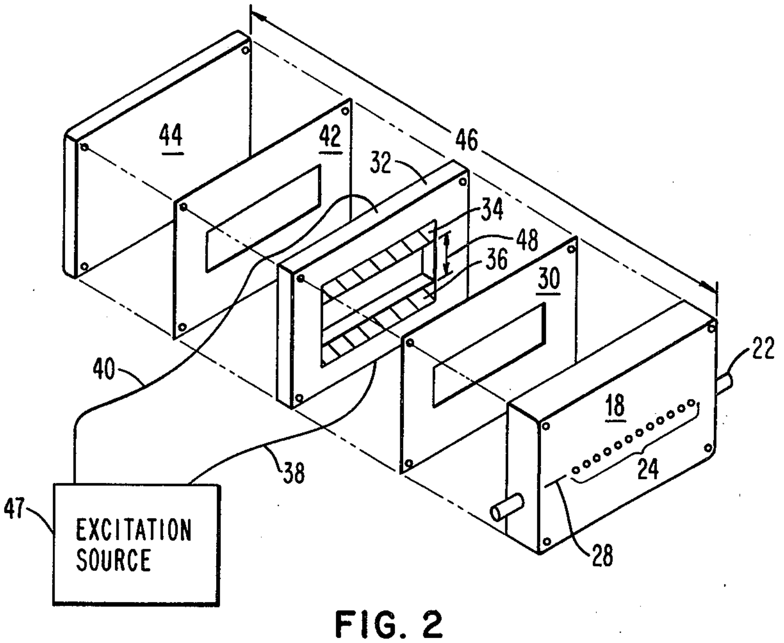
FIG. 2 is an exploded perspective view of a fluid jet drop generator fabricated in accordance with the invention.
Figure 4:
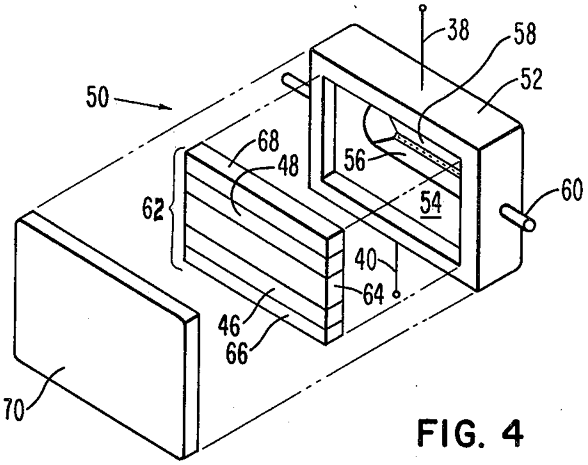
FIG. 4 shows an alternate embodiment of a drop generator constructed in accordance with the invention.

Referring to FIGS. 2 and 4, alternate embodiments of a fluid jet drop generator assembly are shown. The generator outputs a plurality of fluid streams which break up into streams of uniform droplets at a common point downstream from the nozzle plate. When the fluid comprises a conductive writing fluid, the drops may selectively be given an electrostatic charge upon break-off, and the charged drop subsequently deflect to a gutter, while the uncharged drops continue towards the recording medium for selectively printing data on the medium. Alternately, if the fluid comprises a magnetic writing fluid, then the droplets may be selectively deflected by magnetic fields. Since both of these systems are well known in the art, details will not be given here. Suffice it to say that the showing in the figures may be used with either system.

As is well known, fluid streams emanating from nozzle orifices, tend to become unstable and break into droplets at different points from the nozzle plate. Practical uses of droplets for purposes such as printing dictates that break-off be uniform across each nozzle. Generally, if the system (that is the drop generator) is operated at a particular frequency, then the drive voltage break-off distance usually remains in acceptable range. Any changes in drive voltage or frequency tend to cause break-off at different points downstream from the nozzle plate. As such, prior art drop generators usually operate within a single frequency and voltage level.

Figure 1:
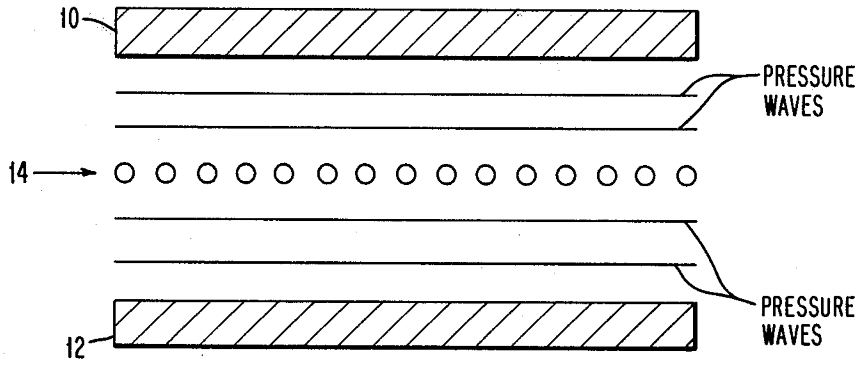
FIG. 1 is a schematic showing the orientation between the crystal pressure inducing waves and the nozzle array. The showing is helpful in understanding the orientation of the drop generator components.

Turning to FIG. 1 for the moment, is a graphical representation showing the intended orientation for the perturbation means 10 and 12, hereinafter called crystals 10 and 12, and the nozzle orifices 14. As can be seen in the sketch, the crystals 10 and 12 are disposed opposite to one another and the nozzle wafer containing the nozzle orifices 14 is disposed intermediate the crystals. The two crystals 10 and 12 are preferrably planar crystals polarized in the same direction with their longitudinal axis running parallel to each other. One preferable configuration is that the crystals are placed equal distance from the axis (not shown) running through the center of the nozzles 14. Stated another way, the crystals are displaced in spaced relation and at right angles to the nozzle jets. When an excitation source (not shown) is coupled to the crystals, the crystals expand and contract radially and send out pressure waves which meet and reinforce intermediate said crystals. Since the nozzle jet is disposed along the line of increase pressure wa The below-listed Table 1 gives data of results obtained when a head fabricated in accordance with the conceptual showing of FIG. 1 was run in an actual ink jet printer.

TABLE I

| Stream # | 67 VRMS 130 KHZ | 38 VRMS 138 KHZ | 39 VRMS 140 KHZ |
|---|---|---|---|
| 1 | 24.2 | 25.8 | 26.9 |
| 2 | 24.4 | 25.2 | 27.0 |
| 3 | 23.7 | 25.5 | 26.9 |
| 4 | 23.7 | 25.3 | 26.6 |
| 5 | 23.6 | 25.8 | 26.5 |
| 6 | 23.6 | 25.7 | 26.4 |
| 7 | 23.2 | 26.3 | 26.3 |
| 8 | 23.2 | 26.0 | 26.2 |
| 9 | 23.2 | 26.1 | 26.1 |
| 10 | 23.3 | 26.2 | 26.6 |
| 11 | 23.4 | 26.2 | 26.7 |
| 12 | 23.4 | 26.1 | 26.7 |
| 13 | 23.3 | 25.9 | 26.7 |
| 14 | 23.2 | 25.9 | 26.7 |
| 15 | 23.2 | 25.8 | 26.4 |
| 16 | 23.4 | 25.9 | 26.6 |
| 17 | 23.4 | 25.8 | 26.3 |
| 18 | 23.2 | 25.8 | 26.3 |
| 19 | 23.3 | 25.8 | 26.3 |
| 20 | 23.3 | 25.8 | 26.3 |
| 21 | 23.3 | 26.0 | 26.3 |
| 22 | 23.3 | 26.1 | 26.3 |
| 23 | 23.2 | 26.3 | 26.6 |

In the above table, numbering from left to right of the page, the first column represents the stream number. The number 23 means that the head that was run has 23 nozzles. The second column represents the crystal drive voltage and the drop frequency. The third column represents a second drive voltage and a second drop frequency at which the head was run. The fourth column shows still another drive voltage and drop frequency at which the same head was run. As can be seen from the table, the break-off distance for the head at any particular voltage and frequency over a range of say 10 kilohertz, was within $\pm\frac{1}{8}\lambda$. As such, this proves that by fabricating a drop generator in accordance with the teaching of the invention, wideband operation with uniform break-off and uniform drop size can be achieved without loss of other performance.

Figure 3:
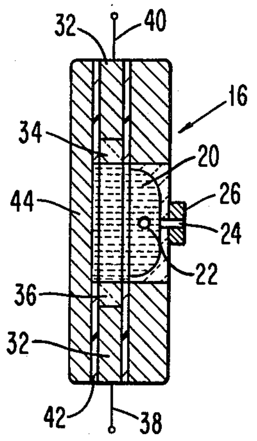
FIG. 3 is a cross-section of the fluid jet drop generator of FIG. 2.

Turning now to FIG. 2, an exploded view of a print head according to the present invention is shown. FIG. 3 shows a cross-section taken across the head of FIG. 2. As such, common elements in FIGS. 2 and 3 will be identified by the same numeral. The fluid jet drop generator 16, includes a nozzle support member 18. A fluid cavity 20 is fabricated on the back surface of nozzle support member 18. As will become clearer subsequently, the function of the cavity 20 is to hold printing fluid such as conductive ink, etc. Fluid into the cavity is supplied through conduit 22. The conduit in turn, is connected to pressure fluid supply source (not shown). A plurality of linearly spaced orifices 24 are formed in a nozzle wafer 26. The nozzle wafer, with the orifice, is then mounted on the front surface of nozzle support member 18. The mounting is such that the orifices communicate or interconnect the cavity in the back surface with the front surface. There are a plurality of ways to have the orifices communicating the back cavity to the front surface. For example, a narrow slit (not shown) is cut through support member 18 along line 28. The length of the slit depends on the length of the nozzle plate. Stated another way, the length of the slit is equivalent to the number of orifices which will be generating streams. The depth of the slit is such that the cavity in the back is connected to the front surface. The nozzle plate, with the orifices, is then seated on the slit so that the center of each hole is in fluidic communication with the cavity. In a preferred design, the cavity has a cross-sectional V shape. The apex of the V coincides with the orifices which interconnects the cavity to the front surface. As such, in this design the apex of the V acts as a focusing channel for directing the fluid into the orifices. With this design, when the conducting fluid such as ink is conveyed from the pressurized source (not shown) through conduit 22 into cavity 20, a plurality of capillary streams of the fluid is extruded through orifices 24. These capillary streams are subsequently broken up downstream from the front surface of nozzle wafer 26 in uniform size for printing. A gasket 30 is fabricated with an opening in its central portion. The size of the opening is such that it surrounds the periphery of the cavity. The gasket is then disposed relative to the nozzle support member 18. The function of the gasket is to prevent ink or print fluid from escaping from the assembly.

A crystal holder 32 is disposed next to the gasket 30. The crystal holder is fabricated with a central opening. The central opening is preferably wider than the central opening of the cavity. A pair of crystals 34 and 36 are mounted on opposite walls of the crystal holder. Stated another way, the crystals are disposed diametrically on opposite walls of the crystal holder. The positioning is such that when all the components of the fluid drop generator 16 are fastened to form a unified structure, the crystals form opposite walls of the fluid cavity 20. A pair of holes are drilled into opposite walls of the crystal holder so that conductors 38 and 40 are connected to the crystal. Conductors 38 and 40 are coupled to an excitation source 47. The excitation source generates electrical signals for exciting the crystals so that the capillary streams emanating from orifices 24 are broken up at a uniform distance from the nozzle plate. Another gasket 42 is disposed over crystal holder 32. An opening is fabricated in the central portion of gasket 42. The opening is such that it surrounds the cavity which is formed to contain the printing fluid. The function of the gasket is to prevent fluid from leaking out of the assembly. A back plate 44 is disposed next to gasket 42. The function of the back plate is to close the back side of the cavity. A plurality of holes are drilled in the periphery of each component, and a plurality of screws (not shown) are used to fasten the component onto the nozzle support member or together to form a unified structure.

It has been observed that excellent results are obtained when the drop generator is designed in accordance with the following expression:

$$\text{Distance } 46 \geqq \lambda/2 \quad (1)$$

$$\text{Distance } 48 \simeq \lambda/2 \quad (2)$$

where: $\lambda$ is the wave length in the print fluid.

Since every print fluid has a characteristic speed for a wave, once the speed is determined, the design of the head is set.

Figure 5:
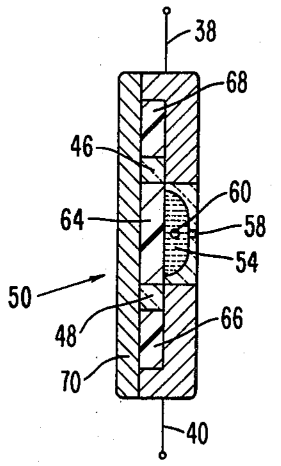
FIG. 5 shows a cross-section of the drop generator of FIG. 4.

FIGS. 4 and 5 show an alternate embodiment for the drop generator according to the present invention. In the embodiment of FIGS. 4 and 5, the perturbation crystals 46 and 48 are not in contact with the print fluid as in the embodiment of FIGS. 2 and 3. Common elements in FIGS. 4 and 5 will be identified with the same numeral. As before, FIG. 4 is a perspective view of the alternate embodiment while FIG. 5 is a cross-section of FIG. 4. The drop generator 50 includes a nozzle support member 52. The nozzle support member 52 includes an ink containing cavity 54 with a focusing cavity 56 disposed on one surface. The ink containing cavity 54 is formed by the rectangular side walls of the nozzle support member. The rectangular side walls extend upwardly from the front surface of the nozzle support member. The focusing cavity 56 conducts a narrow volume of ink into a plurality of nozzle orifices 58 which are mounted on the surface of the nozzle support member opposite the ink containing cavity and the focusing cavity, respectively. As before, ink under pressure is pumped through conduit 60 into the ink containing cavity. A closure member means 62 is disposed upon the upwardly extending rectangular walls of the nozzle support member. The closure member means 62 includes a plurality of strips contiguously disposed in juxtaposition relative to one another. A central strip 64 is fabricated with dimensions large enough to cover the back opening of ink containing cavity 54. Crystals 46 and 48 are disposed on opposite sides of member 64. The crystals extend in parallel direction along the lengthwise dimension of the member. With the member 64 of a sufficient dimension to cover the ink containing cavity 54, when ink is pumped into the cavity, the ink does not contact either of the perturbation crystals. On opposite sides of the crystal and attached thereto are strips 66 and 68 respectively. In the preferred embodiment of this invention, the members 64, 66 and 68 are wave guide members. The wave guiding characteristics sure member means 62. As before, the components are fastened together to form a unified structure. If need be, a gasket (not shown) with a central opening can be introduced between nozzle support member 52 and closure member means 62. Such a gasket prevents the ink from leaking out of the cavity. Any suitable means including screws, etc., can be used for fastening the assembly.

With respect to the intended orientation of the various components in the total structure, it should be noted that the length dimension of both the transducers and the ink cavity is parallel to a line connecting the entrances of the nozzles of the array to the cavity. Thus, the required transducers vibration mode which produces uniform perturbations for the array of ink jet streams is that in which the vibrations are in phase along a line intermediate the crystals and running along the lengthwise direction of the transducers, and in which the amplitudes are uniform over the transducer length about the line on which the nozzle array is in alignment.

It has been observed that when the crystals 46 and 48 are segmented along their longitudinal dimensions (that is segmented so that air gaps are formed between the segments) a more uniform drive is created for a relatively longer head.

While the invention has been particularly shown and described with reference to a preferred and alternate embodiment thereof, it will be understood by those skilled in the art that the foregoing and other changes in form and details may be made therein without departing from the spirit and scope of the invention.

What is claimed is:

1. In a fluid jet drop generator including a fluid supply line connected to a source of pressurized fluid, an ink supply cavity for accepting the pressurized fluid, a nozzle plate with orifices for generating capillary streams from the ink supply cavity, and a signal input connected to a perturbation signal source, the improvement comprising:

a pair of perturbation means spaced diametrically to form side walls of the ink supply cavity;

said perturbation means being in contact with the pressurized fluid and operable to generate a reinforceable pressure zone therein; and an elongated nozzle wafer having a plurality of linear orifices thereon disposed so that the center of said orifices is positioned on the pressure zone.

2. The fluid jet drop generator of claim 1 wherein the spacing between the perturbation means is approximately $\lambda/2$ with $\lambda$ being the wave length of the pressure wave in the pressurized fluid.

3. The fluid jet drop generator of claim 1 wherein the pair of perturbation means includes a pair of planar crystals.

4. The fluid jet drop generator of claim 3 wherein the crystals are polarized in the same direction.

5. The fluid jet drop generator of claim 1 wherein the nozzle wafer includes a single orifice.

6. A wideband variable frequency fluid jet drop generator for an ink jet printing system comprising in combination:

a nozzle support member having an ink supply cavity fabricated on a first surface;

a nozzle wafer having one or more orifices therein, mounted on an opposite surface of said nozzle support member with the orifices being in fluidic communication with the cavity;

a crystal support block having a central opening aligned with the cavity;

a pair of crystals mounted on diametrical sides of the central opening with each crystal being in contact with a print fluid in the ink supply cavity;

a back plate member for closing the cavity; and a means for exciting the crystals so that pressure waves generated in the ink supply cavity are being reinforced along a line coinciding with the orifices.

7. The wideband fluid drop generator of claim 5 further including means for fastening the back plate to the nozzle support member to form a unified structure.

8. The drop generator of claim 7 further including gaskets disposed between the back plate and the crystal support block, the crystal support block and the nozzle support member, said gaskets being operable to stem the flow of ink from said drop generator.

9. The drop generator of claim 7 further including means for supplying ink to the ink supply cavity.

10. The drop generator of claim 6 wherein the spacing between the front surface of the back plate and the nozzle support surface of the nozzle support member is greater than $\lambda/2$ where $\lambda$ is the wave length of the pressure wave within the ink.

11. The drop generator of claim 1 wherein the spacing between the crystals is approximately equal to $\lambda/2$, $\lambda$ being equivalent to the wave length of the pressure wave within the ink.

12. A wideband multifrequency drop generator for use with an ink jet printing system comprising:

a nozzle support member having a cavity fabricated in one surface;

a nozzle wafer having a plurality of orifices mounted on a surface opposite to the cavity surface of said support member, said orifices being operable to extrude ink streams from a supply of ink in the cavity;

a closure member disposed on the cavity surface of the support member, said closure member being operable to form the back wall of the cavity and having wave transmission characteristics substantially equivalent to the wave transmission characteristics of the ink;

a pair of perturbation means disposed on opposite sides of the closure member;

a back plate disposed relative to the closure member; and means for fastening the back plate to the nozzle support member.

13. The wideband multifrequency drop generator of claim 12 wherein the closure member is being fabricated from wave guide material.

14. The wideband multifrequency drop generator of claim 12 further including a means for energizing the perturbation means so that the ink streams are broken up into uniformly spaced droplets at a common point from the nozzle plate.

15. The wideband multifrequency drop generator of claim 12 wherein the perturbation means is being segmented along its longitudinal axis.

16. A method for generating uniform droplets for printing on a support media comprising:

(a) supplying pressurized ink to a cavity;

(b) disposing a pair of perturbation crystals to form opposite walls of the cavity, said crystals being in contact with the pressurized ink;

(c) exciting the crystals to contract and expand radially so that pressure waves are generated in the ink and are being reinforced along a pressure line midway between the crystals; and (d) generating a plurality of capillary droplet streams from said pressure line.

17. In a fluid jet drop generator including a fluid supply line connected to a source of pressurized fluid, an ink supply cavity for accepting the pressurized fluid, a nozzle plate with orifices for generating capillary streams from the ink supply cavity, and a signal input connected to a perturbation signal source, the improvement comprising:

a pair of perturbation means spaced diametrically to form side walls of the ink supply cavity and operable to generate pressure waves;

a means operable to couple the pressure waves outputted from the perturbation means into the pressurized fluid, said means having a wave guide characteristic substantially equivalent to the wave guide characteristic of the pressurized fluid; and an elongated nozzle wafer having a plurality of linear orifices thereon disposed so that the center of said orifices is positioned on a reinforced pressurized zone.

18. The fluid jet drop generator of claim 17 wherein the means is fabricated from a material taken from the group comprising noryl, PVC, acrylic and teflon.

19. The fluid jet drop generator of claim 17 wherein the nozzle wafer includes a single orifice.

* * * * *